(12) United States Patent
Cournoyer (10) Patent No.: US 11,837,706 B2
(45) Date of Patent: Dec. 5, 2023

(54) ADHESIVE BOND SETTING WITH PRE-CURED ADHESIVE STANDOFFS

(71) Applicant: Rivian IP Holdings, LLC, Plymouth, MI (US)

(72) Inventor: Travis Cournoyer, Redondo Beach, CA (US)

(73) Assignee: Rivian IP Holdings, LLC, Plymouth, MI (US)

( * ) Notice: Subject to any disclaimer, the term of this patent is extended or adjusted under 35 U.S.C. 154(b) by 564 days.

(21) Appl. No.: 16/824,375

(22) Filed: Mar. 19, 2020

(65) Prior Publication Data

US 2021/0296719 A1     Sep. 23, 2021

(51) Int. Cl.
*H01M 10/6555* (2014.01)
*H01M 10/613* (2014.01)
*H01M 10/6551* (2014.01)
*H01M 10/653* (2014.01)
*H01M 10/643* (2014.01)
*H01M 10/6554* (2014.01)
*H01M 50/213* (2021.01)
*H01M 10/64* (2014.01)

(52) U.S. Cl.
CPC ....... *H01M 10/643* (2015.04); *H01M 10/613* (2015.04); *H01M 10/653* (2015.04); *H01M 10/6551* (2015.04); *H01M 10/6554* (2015.04); *H01M 50/213* (2021.01); *H01M 10/64* (2015.04)

(58) Field of Classification Search
CPC ........... H01M 10/6554; H01M 10/613; H01M 10/643; H01M 10/653; H01M 10/6551; H01M 10/64; H01M 50/213; Y02E 60/10
See application file for complete search history.

(56) References Cited

U.S. PATENT DOCUMENTS

| 10,644,366 B2 * | 5/2020 | Landerer ........... H01M 10/6551 |
| 10,707,462 B1 * | 7/2020 | Lane ................... H01M 10/613 |
| 11,038,225 B2 * | 6/2021 | Hofer .................. H01M 50/271 |
| 2013/0230746 A1 * | 9/2013 | Byun .................. H01M 10/425 429/185 |
| 2014/0065455 A1 * | 3/2014 | Chuang ............... H01M 10/613 429/82 |
| 2015/0079449 A1 * | 3/2015 | Kim .................... H01M 50/507 429/121 |

(Continued)

FOREIGN PATENT DOCUMENTS

| CN | 107195824 A * | 9/2017 | ........ H01M 10/6554 |
| WO | WO-2012117681 A1 * | 9/2012 | ........ H01M 10/0413 |

*Primary Examiner* — Kaity V Chandler
(74) *Attorney, Agent, or Firm* — Haley Guiliano LLP (57) ABSTRACT

A battery module and a method of assembling the battery module are provided. The battery module includes a cooling plate having a cooling surface, an adhesive standoff disposed on a first portion of the cooling surface, and a securing adhesive disposed on a second portion of the first cooling surface. The securing adhesive is disposed on the cooling surface after the adhesive standoff is substantially cured. The battery module further includes a plurality of battery cells. A first end of each of the plurality of battery cells is secured to the cooling surface by the securing adhesive. The adhesive standoff maintains the first end of each of the plurality of battery cells a distance away from the cooling surface while the securing adhesive cures.

20 Claims, 7 Drawing Sheets

(56) References Cited

U.S. PATENT DOCUMENTS

| | | | |
|---|---|---|---|
| 2016/0118633 A1* | 4/2016 | Hongo | H01M 50/507 |
| | | | 429/121 |
| 2018/0131028 A1* | 5/2018 | Offutt | H01M 50/20 |
| 2018/0316071 A1* | 11/2018 | Newman | H01M 10/613 |
| 2018/0351220 A1* | 12/2018 | Homann | H01M 10/653 |
| 2019/0280355 A1* | 9/2019 | Kim | H01M 50/233 |
| 2019/0296310 A1* | 9/2019 | Newman | H01M 50/516 |
| 2019/0296321 A1* | 9/2019 | Newman | H01M 50/296 |
| 2019/0296407 A1* | 9/2019 | Newman | H01M 10/6555 |
| 2019/0372173 A1* | 12/2019 | Juzkow | H01M 10/65 |
| 2020/0006825 A1* | 1/2020 | Lee | H01M 10/6567 |
| 2020/0052260 A1* | 2/2020 | Fees | H01M 50/293 |
| 2020/0067041 A1* | 2/2020 | Wurden | H01R 13/11 |
| 2020/0153057 A1* | 5/2020 | Wynn | H01M 10/6568 |
| 2020/0274118 A1* | 8/2020 | Fees | H01M 50/213 |
| 2020/0280032 A1* | 9/2020 | Yebka | C09J 7/30 |

* cited by examiner

FIG. 13B

ADHESIVE BOND SETTING WITH PRE-CURED ADHESIVE STANDOFFS

SUMMARY

It is advantageous to package battery cells closely in a battery module to provide high energy density battery modules. Cylindrical battery cells may be arranged with the bottom end of each of the battery cells secured to a cooling plate of the battery module using an adhesive. In order to maximize cooling (or heating), it is advantageous to minimize the thickness of the adhesive. However, the thickness of the adhesive must also be thick enough to electrically isolate the battery cells from the cooling plate. Thus, it is advantageous to tightly control the thickness of the adhesive according to the requirements of the battery module. Additionally, to assist in uniform battery cell cooling (or heating), it is advantageous to maintain the uniformity of the distance between the bottom end of each of the battery cells and the cooling plate. It is also advantageous to have the adhesive to be a uniform material with a uniform coefficient of thermal expansion. It is also advantageous to have the adhesive not be impregnated with glass beads or other materials (e.g., for spacing purposes), which are difficult to control tolerances of, which may penetrate a coating of the cooling plate, and which have a different coefficient of thermal expansion from the adhesive. In accordance with some embodiments of the present disclosure, one or more of these advantages are achieved.

In some embodiments of the present disclosure, a battery module and a method of assembling the battery module are provided. The battery module includes a cooling plate having a cooling surface, an adhesive standoff disposed on a first portion of the cooling surface, and a securing adhesive disposed on a second portion of the first cooling surface. The securing adhesive is disposed on the cooling surface after the adhesive standoff is substantially cured. The battery module further includes a plurality of battery cells. A first end of each of the plurality of battery cells is secured to the cooling surface by the securing adhesive. The adhesive standoff maintains the first end of each of the plurality of battery cells a distance away from the cooling surface while the securing adhesive cures.

In some embodiments of the present disclosure, the adhesive standoff and the securing adhesive may be a same adhesive.

In some embodiments of the present disclosure, the adhesive standoff may be arranged in a predetermined pattern, and respective portions of the predetermined pattern under the first end of each of the plurality of battery cells are all the same (e.g., they all have the same arrangement of adhesive).

In some embodiments of the present disclosure, the predetermined pattern may be a plurality of parallel strips of the adhesive standoff, and the arrangement of the adhesive standoff of the respective portions of the predetermined pattern under each battery cell may include exactly two of the plurality of parallel strips.

In some embodiments of the present disclosure, the predetermined pattern may be a plurality of clusters of at least three studs of the adhesive standoff, and the arrangement of the adhesive standoff under each battery cell may include exactly one cluster of the plurality of clusters.

In some embodiments of the present disclosure, the predetermined pattern may be a plurality of strips of the adhesive standoff arranged in a diagonal grid, and the first end of each of the plurality of battery cells may be centered at an origin of a grid crossing of the diagonal grid.

In some embodiments of the present disclosure, the adhesive standoff may have a first thickness, and a width of a bottom surface of the predetermined pattern adjacent to the cooling surface may be larger than a width of a top surface, opposite to the bottom surface, of the predetermined pattern.

In some embodiments of the present disclosure, the first plurality of batteries may be arranged in a hexagonal close-packed arrangement, each of the plurality of battery cells may include an exposed region of electrically-active casing that covers the first end and a side of each of the plurality of battery cells, and a dielectric coating on a first side of the cooling plate may form the cooling surface.

In some embodiments of the present disclosure, the adhesive standoff may be a first adhesive standoff, and the securing adhesive may be a first securing adhesive. The battery module may further include a second adhesive standoff disposed on a third portion of the cooling surface, and a second securing adhesive disposed on a fourth portion of the cooling surface. The second securing adhesive may be disposed on the cooling surface after the second adhesive standoff is substantially cured. The battery module may further include a terminal. A bottom surface of the terminal may be secured to the cooling surface by the second securing adhesive, and the second adhesive standoff may maintain the bottom surface of the terminal a distance away from the cooling surface while the adhesive cures.

In some embodiments of the present disclosure, the cooling surface may be a first cooling surface, the adhesive standoff may be a first adhesive standoff, the securing adhesive may be a first securing adhesive, the plurality of battery cells may be a first plurality of battery cells, and the cooling plate may further include a second cooling surface, opposite to the first cooling surface. The battery module may further include a second adhesive standoff disposed on a first portion of the second cooling surface, and a second securing adhesive disposed on a second portion of the second cooling surface. The second securing adhesive may be disposed on the second cooling surface after the second adhesive standoff is substantially cured. The battery module may further include a second plurality of battery cells. A first end of each of the second plurality of battery cells may be secured to the second cooling surface by the second securing adhesive, and the second adhesive standoff may maintain the first end of each of the second plurality of battery cells a distance away from the second cooling surface while the adhesive cures.

In some embodiments, a method of assembling a battery module is provided. The method may include providing a cooling plate having a cooling surface and providing an adhesive standoff on a first portion of the cooling surface. The method may further include providing, after the adhesive standoff is substantially cured, a securing adhesive on a second portion of the cooling surface, providing a plurality of battery cells, and pressing, before the securing adhesive is cured, a first end of each of the plurality of battery cells into the securing adhesive. The substantially cured adhesive standoff maintains the first end of each of the plurality of battery cells at a distance away from the cooling surface while the securing adhesive cures. The method may further include curing the securing adhesive to secure the plurality of battery cells to the cooling surface.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and shall not be considered limiting of the breadth, scope, or applicability of these concepts. It should be noted that for clarity and ease of illustration these drawings are not necessarily made to scale.

DETAILED DESCRIPTION

In view of the foregoing, and in accordance with some embodiments of the present disclosure, it would be advantageous to provide and easily manufacture a battery module in which the distance between a plurality of battery cells and a cooling plate are tightly controlled, thereby ensuring consistent cooling (or heating) of the plurality of battery cells.

Figure 1A:
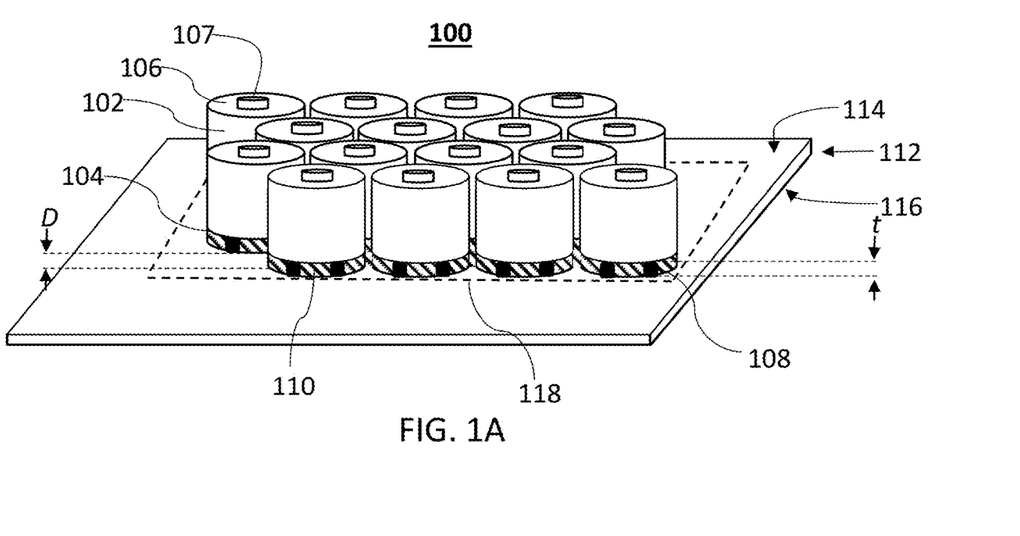
FIG. 1A shows a view of a battery module, in accordance with some embodiments of the present disclosure.

Systems and methods are disclosed herein that provide an improved battery module. FIG. 1A shows a view of a battery module 100, in accordance with some embodiments of the present disclosure. As shown, the battery module 100 includes a first plurality of battery cells 102. Each of the battery cells 102 may be cylindrical and may have a first end 104 comprising a first electrical terminal and a second end 106 having a second electrical terminal 107 (e.g., a center button terminal). In some embodiments of the present disclosure, each of the battery cells 102 may have an exposed region of electrically-active casing or a conductive jacket that covers at least a portion of the first end 104 and side of each battery cell 102, forming the first electrical terminal. To increase packing density, the battery cells 102 may be arranged in rows that are offset from each other (e.g., in a hexagonal close-packed arrangement). In some embodiments of the present disclosure, each adjacent pair of the battery cells 102 may be 1.5 mm apart or less. Groups of the battery cells 102 may be electrically connected in series or parallel using one or more busbars (not shown for simplicity); in some cases, one subgroup of battery cells 102 connected in parallel may be connected to another subgroup of battery cells 102 in series. It should be understood that there may be any suitable number of the battery cells 102.

The battery module 100 may further include a thermal transfer plate, e.g., a cooling plate 112, as shown. In some embodiments of the present disclosure, the cooling plate 112 may be used to selectively cool (or heat) the battery module 100. In some embodiments of the present disclosure, the cooling plate 112 may have one or more channels for cooling/heating fluid to travel through. In some embodiments of the present disclosure, the cooling plate 112 may be composed of an electrically conductive material (e.g., metal such as aluminum). In some embodiments, in order to reduce the likelihood of an electrical short between the battery cells 102 and a first cooling surface 114, the first cooling surface 114 may comprise a dielectric coating. The cooling plate 112 may have a second cooling surface 116, opposite to the first cooling surface 114, which may also comprise a dielectric coating.

As shown, the battery cells 102 may be spaced apart from the first cooling surface 114 by an adhesive standoff 108 having a first thickness t. As more clearly shown in FIG. 1B, the adhesive standoff 108 is arranged in a predetermined pattern that corresponds to a predetermined arrangement (e.g., the hexagonal close-packed arrangement) of the battery cells 102. The battery cells 102 may then be secured to the first cooling surface 114 by a securing adhesive 110. In order to maintain the battery cells 102 at a distance D from the first cooling surface 114, which is greater than or equal to the first thickness t of the adhesive standoff 108, the adhesive standoff 108 may be substantially cured (e.g., pre-cured) before either of the battery cells 102 or the securing adhesive 110 are added to the battery module 100.

In some embodiments of the present disclosure, the adhesive standoff 108 and the securing adhesive 110 may be the same adhesive (e.g., have the same chemical formula). The electrical, thermal, and mechanical properties of the adhesives of the present disclosure may correspond to the engineering and manufacturing requirements associated with the battery module 100. Aside from coupling the battery cells 102 to the first cooling surface, the adhesive of the securing adhesive 110 (and the adhesive standoff 108) may have three primary requirements. First, the adhesive should be able to move thermal masses quickly so that the temperature of the battery cells 102 may be controlled quickly (e.g., by a coolant pump pumping coolant through channels within the cooling plate 112). Second, the adhesive should maintain electrical isolation between the battery cells 102 and the cooling plate 112. Third, the adhesive should maintain electrical isolation between each of the battery cells 102 themselves. To meet the second and third requirements, the adhesive should have sufficient dielectric properties. It may be advantageous to minimize the thickness of the securing adhesive 110 to increase the cooling effect from the cooling plate 112 on the first ends 104 of the battery cells 102. It may also be advantageous to minimize the thickness of the securing adhesive 110 for space-saving purposes. However, the securing adhesive 110 should also be thick enough to account for worst-case tolerance stack-up, high voltage isolation requirements, and electrical or thermal insulation requirements of the battery module 100. Because the securing adhesive 110 is not required to be impregnated with glass beads or other materials, which may penetrate the dielectric coating of the cooling plate 112 and which may generally have wide tolerances, the thickness of the securing adhesive 110 may be tightly controlled, without compromising the electrical isolation between the battery cells 102 and the cooling plate 112. It may also be advantageous to maintain the uniformity of the thickness of the securing adhesive 110 in order to ensure that the battery cells 102 are uniformly cooled (or heated).

As shown, the first end 104 of each of the battery cells 102 is secured to the first cooling surface 114 of the cooling plate 112 through the securing adhesive 110. In some embodiments of the present disclosure, as described in greater detail below, each of the battery cells 102 may be equally spaced from the first cooling surface 114 by the securing adhesive standoff 108. However, it may also be advantageous to space some of the battery cells 102 at different distances from the first cooling surface 114 if the cooling plate 112 is not able to perform uniform cooling (or heating). For example, battery cells 102 positioned directly above a cooling channel in the cooling plate 112 may be spaced farther away from the first cooling surface 114 by the adhesive standoff 108 than battery cells positioned away from a cooling channel in the cooling plate 112. It will be understood that if different standoff heights were used, then other components of the battery module (e.g., busbars or shrouds) may be shaped to accommodate the different stack-up height of the battery cells.

As described above, the predetermined pattern of the adhesive standoff 108 may be the same adhesive as the securing adhesive 110, but may be substantially cured before the battery cells 102 or the securing adhesive 110 are disposed on the cooling plate 112, so as to act as a standoff that maintains the first end 104 of each of the battery cells 102 the distance D away from the first cooling surface 114 while the securing adhesive 110 cures and thermally and structurally couples the battery cells 102 to the first cooling surface 114. The adhesive of the adhesive standoff 108 may be arranged in any pattern that supports the battery cells 102. However, it may be advantageous to reduce or minimize the contact area between the adhesive standoff 108 and the battery cells 102 so as to increase or maximize the securing of the battery cells 102 to the first cooling surface 114 by the securing adhesive 110.

Figure 1B:
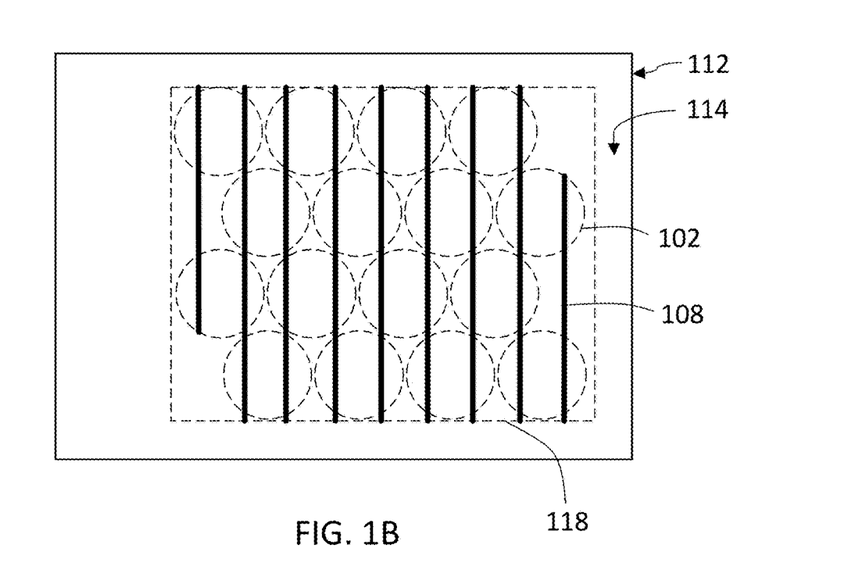
FIG. 1B shows a top view of an adhesive standoff disposed on a first cooling surface of a cooling plate, in accordance with some embodiments of the present disclosure.

FIG. 1B shows a top view of the adhesive standoff 108 disposed on a first portion of the first cooling surface 114 of the cooling plate 112, in accordance with some embodiments of the present disclosure. As shown, the adhesive standoff 108 is arranged in a predetermined pattern that corresponds to the predetermined arrangement (e.g., the hexagonal close-packed arrangement) of the battery cells 102. For example, the adhesive standoff 108 is arranged as a plurality of parallel strips of adhesive, perpendicular to the rows of the battery cells 102 and in a regular pattern (e.g., within a battery mounting region 118 on the first cooling surface 114), so that the first end 104 of each of the battery cells 102 is supported by exactly two of the adhesive strips. As shown, respective portions of the predetermined pattern that support the first end 104 of each of the battery cells 102 may have the same adhesive arrangement. However, this pattern is only one embodiment, and the adhesive standoff 108 may be arranged in any pattern that sufficiently supports the battery cells 102. For example, the adhesive standoff 108 may be arranged in any of the patterns shown in FIGS. 2-5.

Figure 2:
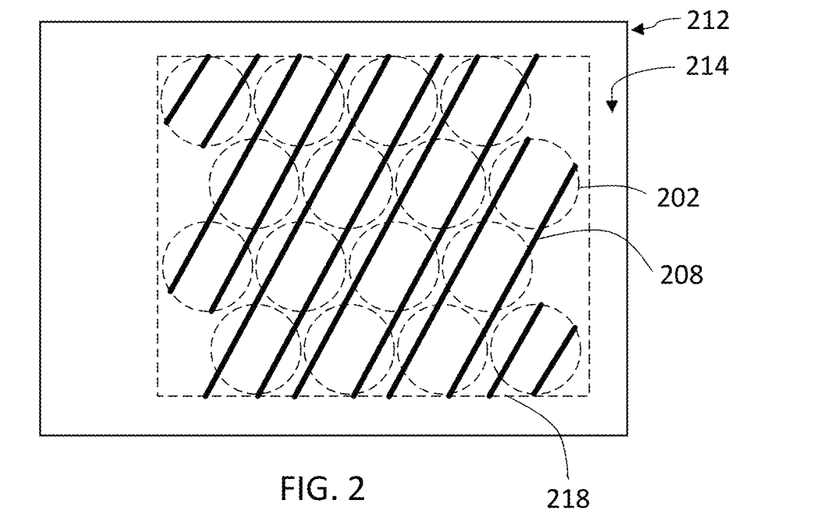
FIG. 2 shows a top view of an adhesive standoff disposed on a first cooling surface of a cooling plate, in accordance with some embodiments of the present disclosure.

FIG. 2 shows a top view of an adhesive standoff 208 disposed on a first portion of a first cooling surface 214 of a cooling plate 212, in accordance with some embodiments of the present disclosure. As shown, the adhesive standoff 208 is arranged in a predetermined pattern that corresponds to the predetermined arrangement (e.g., the hexagonal close-packed arrangement) of battery cells 202. For example, the adhesive standoff 208 is arranged as a plurality of parallel strips of adhesive, transversal to the rows of the battery cells 202 (e.g., at an angle of 60° with respect to the rows of battery cells 202) and in a regular pattern (e.g., within a battery mounting region 218 on the first cooling surface 214), so that a first end of each of the battery cells 202 is supported by exactly two of the adhesive strips. As shown, respective portions of the predetermined pattern that support the first end of each of the battery cells 202 may have the same adhesive arrangement.

Figure 3:
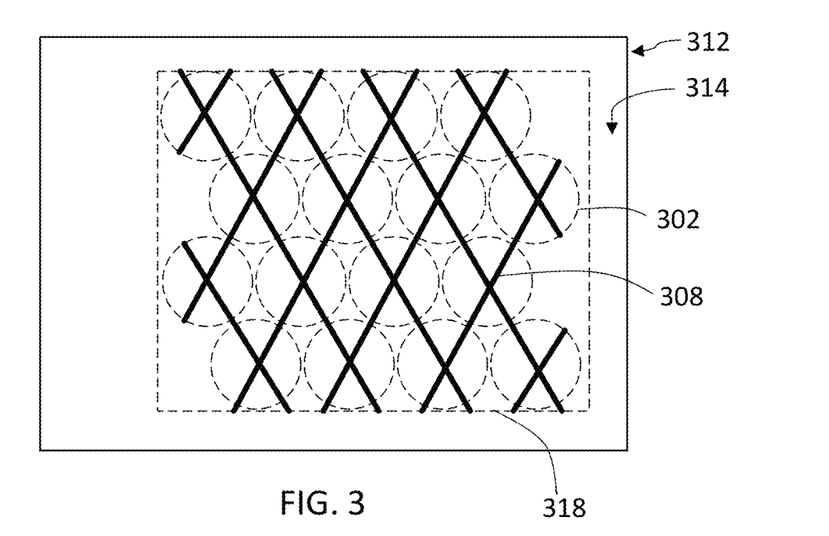
FIG. 3 shows a top view of an adhesive standoff disposed on a first cooling surface of a cooling plate, in accordance with some embodiments of the present disclosure.

FIG. 3 shows a top view of an adhesive standoff 308 disposed on a first portion of a first cooling surface 314 of a cooling plate 312, in accordance with some embodiments of the present disclosure. As shown, the adhesive standoff 308 is arranged in a predetermined pattern that corresponds to the predetermined arrangement (e.g., the hexagonal close-packed arrangement) of battery cells 302. For example, the adhesive standoff 308 is arranged as a plurality of strips of adhesive arranged in a diagonal grid (e.g., within a battery mounting region 318 on the first cooling surface 314), so that a first end of each of the battery cells 302 is centered at an origin of each grid crossing. As shown, respective portions of the predetermined pattern that support the first end of each of the battery cells 302 may have the same adhesive arrangement.

Figure 4:
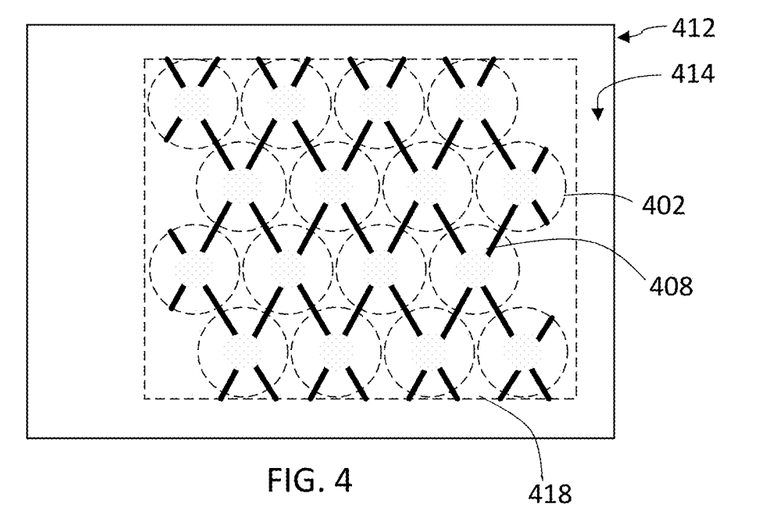
FIG. 4 shows a top view of an adhesive standoff disposed on a first cooling surface of a cooling plate, in accordance with some embodiments of the present disclosure.

FIG. 4 shows a top view of an adhesive standoff 408 disposed on a first portion of a first cooling surface 414 of a cooling plate 412, in accordance with some embodiments of the present disclosure. As shown the adhesive standoff 408 is arranged in a predetermined pattern that corresponds to the predetermined arrangement (e.g., the hexagonal close-packed arrangement) of battery cells 402. For example, similar to FIG. 3, the adhesive standoff 408 is arranged as a plurality of strips of adhesive arranged in a diagonal grid (e.g., within a battery mounting region 418 on the first cooling surface 414), except that an origin of each grid crossing is omitted and a first end of each of the battery cells 402 is centered at where the origin of each grid crossing would be. As shown, respective portions of the predetermined pattern that support the first end of each of the battery cells 402 may have the same adhesive arrangement.

Figure 5:
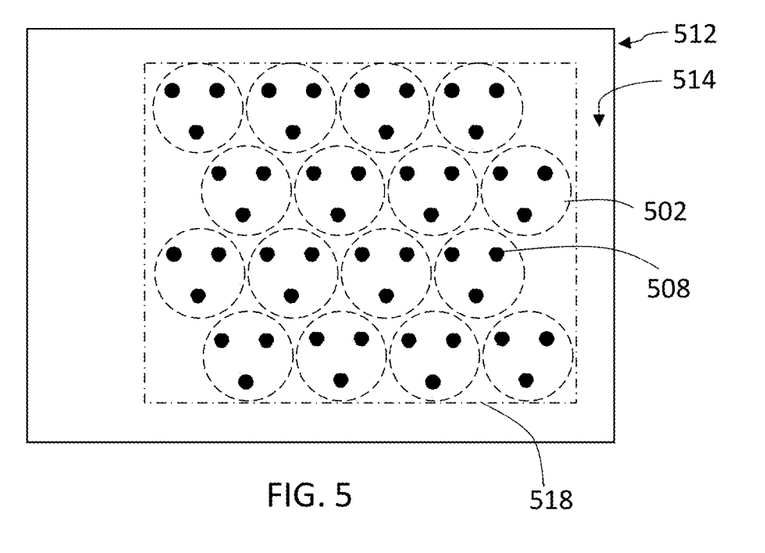
FIG. 5 shows a top view of an adhesive standoff disposed on a first cooling surface of a cooling plate, in accordance with some embodiments of the present disclosure.

FIG. 5 shows a top view of an adhesive standoff 508 disposed on a first portion of a first cooling surface 514 of a cooling plate 512, in accordance with some embodiments of the present disclosure. As shown the adhesive standoff 508 is arranged in a predetermined pattern that corresponds to the predetermined arrangement (e.g., the hexagonal close-packed arrangement) of battery cells 502. For example, the adhesive standoff 508 is arranged as a plurality of clusters each comprised of three studs of adhesive (e.g., dot-shaped) arranged in a regular pattern (e.g., within a battery mounting region 518 on the first cooling surface 514), so that each of the battery cells 502 is supported by a cluster of studs. As shown, respective portions of the predetermined pattern that support a first end of each of the battery cells 502, may have the same adhesive arrangement. Although three studs of adhesive per cluster are shown, this is merely illustrative, and each cluster may comprise more than three studs of adhesive.

It will be understood that the adhesive standoff arrangements of FIGS. 1B-5 may have different advantages and the particular arrangement chosen for a particular application may be selected based on a variety of needs or factors. For example, the arrangement of FIG. 5 may minimize the contact surface between the battery cells and the adhesive standoff, which increases the contact surface for the securing adhesive. As another example, the adhesive standoff pattern of FIG. 3 may evenly direct extra securing adhesive to the cylindrical sides of the battery cells. As another example, the vertical adhesive standoff lines of FIG. 1B and FIG. 2 may be easily applied to the cooling surface with a uniform height.

FIGS. 6-9 show a series of steps in a process for assembling a battery module 100, in accordance with some embodiments of the present disclosure. Each of the battery module components used in assembling the battery module 100 and described in the present disclosure may be provided by manufacturing or assembling the component itself, or by obtaining the component from a supply of components.

Figure 6:
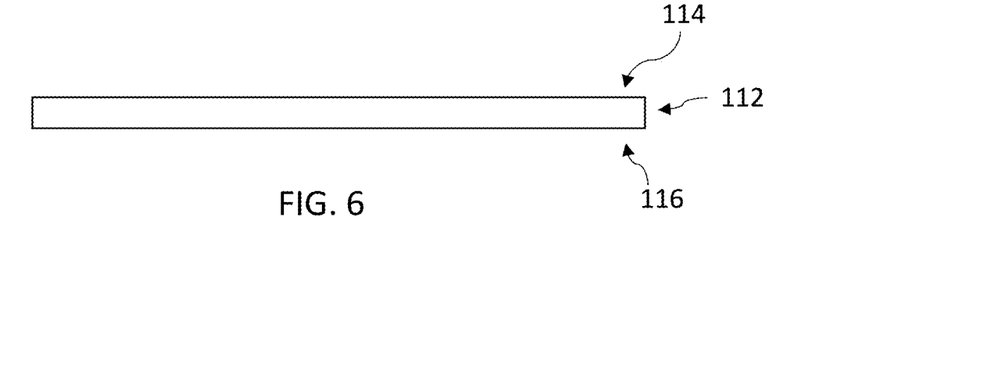
FIG. 6 shows a side view of a battery module assembly having a cooling plate, in accordance with some embodiments of the present disclosure.

FIG. 6 is a side view of the cooling plate 112. In some embodiments of the present disclosure, as set forth above, the first cooling surface 114 and the second cooling surface 116 may comprise a thin dielectric coating applied to each of the top surface and the bottom surface of the cooling plate 112.

Figure 7:
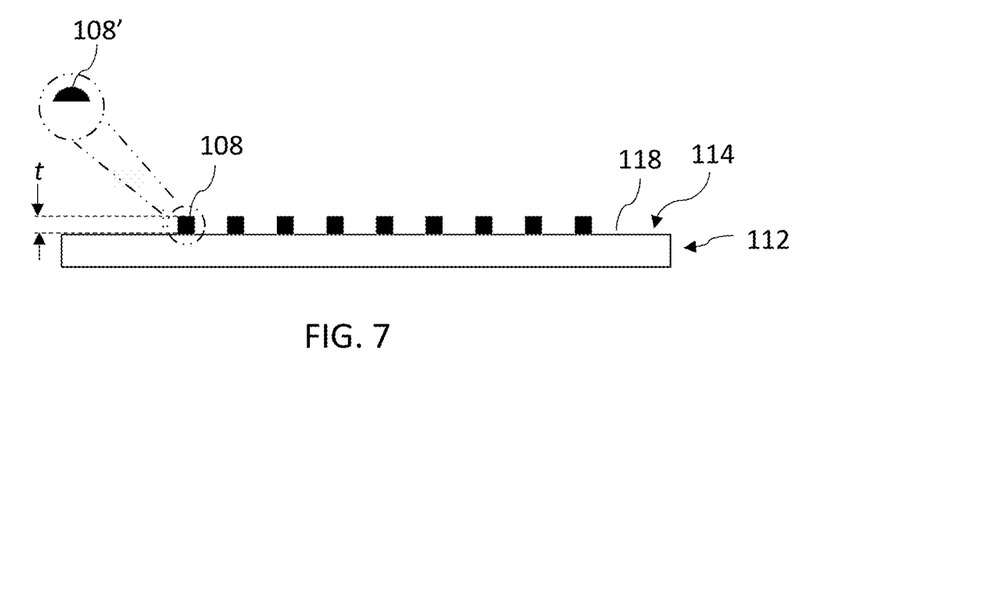
FIG. 7 shows a side view of the battery module assembly of FIG. 6, following providing of an adhesive standoff on a first cooling surface of the cooling plate, in accordance with some embodiments of the present disclosure.

FIG. 7 shows the battery module assembly of FIG. 6, following the disposing of the adhesive standoff 108 on the first portion of the first cooling surface 114. As illustrated, the adhesive standoff 108 is disposed within the battery mounting region 118 on the first portion of the first cooling surface 114. The adhesive standoff 108 has a thickness t. In accordance with some embodiments of the present application, the thickness t may be 85 μm-115 μm. However, this is only one embodiment and the thickness t may be optimized for any configuration of the battery module 100. In the embodiment illustrated in FIG. 6, the adhesive of the adhesive standoff 108 is arranged as a plurality of parallel lines in a regular pattern (e.g., FIG. 1B). However, this is only an example and the adhesive may be arranged in any arrangement which supports the battery cells 102 (e.g., FIGS. 2-5).

As shown, each of the strips of the adhesive standoff 108 has a rectangular cross-section. However, it may be advantageous to minimize the thickness at the top and/or the bottom of each strip of adhesive. For example, each strip of adhesive of the adhesive standoff 108 may alternatively have the semicircular cross-section 108' shown in FIG. 7. However, this is only an example, and each strip of adhesive of the adhesive standoff 108 may have any shaped crossed section which supports the battery cells 102 (e.g., triangular, circular, etc.).

The adhesive standoff 108 may be disposed on the first portion of the first cooling surface 114 in a variety of ways. For example, in some embodiments of the present disclosure, the adhesive standoff 108 may be disposed on the first portion of the first cooling surface 114 by three-dimensional (3D) printing the adhesive standoff 108 on the first cooling surface 114. In some embodiments of the present disclosure, the adhesive standoff 108 may be disposed on the first portion of the first cooling surface 114 by extruding the adhesive standoff 108 on the first cooling surface 114. In some embodiments of the present disclosure, the adhesive standoff 108 may be cut from a pre-cured sheet of adhesive and disposed on the first portion of the first cooling surface 114. In some embodiments of the present disclosure, an adhesive sheet may be disposed on the first cooling surface 114 and a portion of the adhesive sheet may be etched away to form the adhesive standoff 108 on the first portion of the first cooling surface 114. However, these embodiments are merely exemplary, and any method which allows the first thickness t of the adhesive standoff 108 to be controlled (e.g., tightly controlled) may be used.

Figure 8:
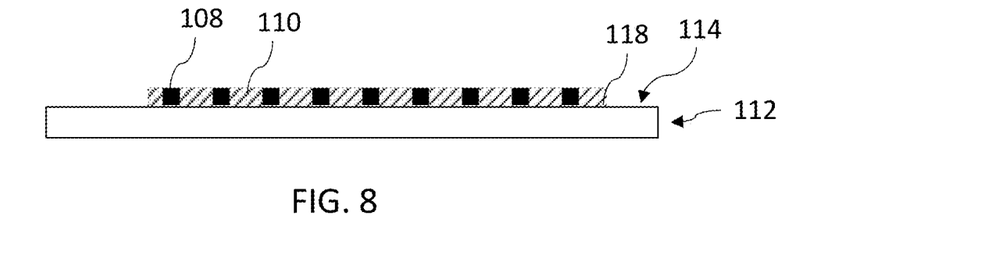
FIG. 8 shows a side view of the battery module assembly of FIG. 7, following providing of an adhesive on a first cooling surface of the cooling plate, in accordance with some embodiments of the present disclosure.

FIG. 8 shows the battery module assembly of FIG. 7, following the disposing of the securing adhesive 110 on a second portion of the first cooling surface 114, after the adhesive standoff 108 is substantially cured. As shown, in some embodiments of the present disclosure, the securing adhesive 110 may be disposed on a portion of the battery mounting region 118 not covered by the adhesive standoff 108 (e.g., corresponding to a planned placement of the first end 104 of the battery cells 102). In some embodiments of the present disclosure, the securing adhesive 110 may also be disposed on the adhesive standoff 108. In order to ensure that the securing adhesive 110 firmly secures battery cells 102 to the first cooling surface 114, the adhesive of the securing adhesive 110 may be disposed to have a thickness that is greater than the thickness t of the substantially cured adhesive standoff 108, as shown in greater detail in FIGS. 11 and 12.

Figure 9:
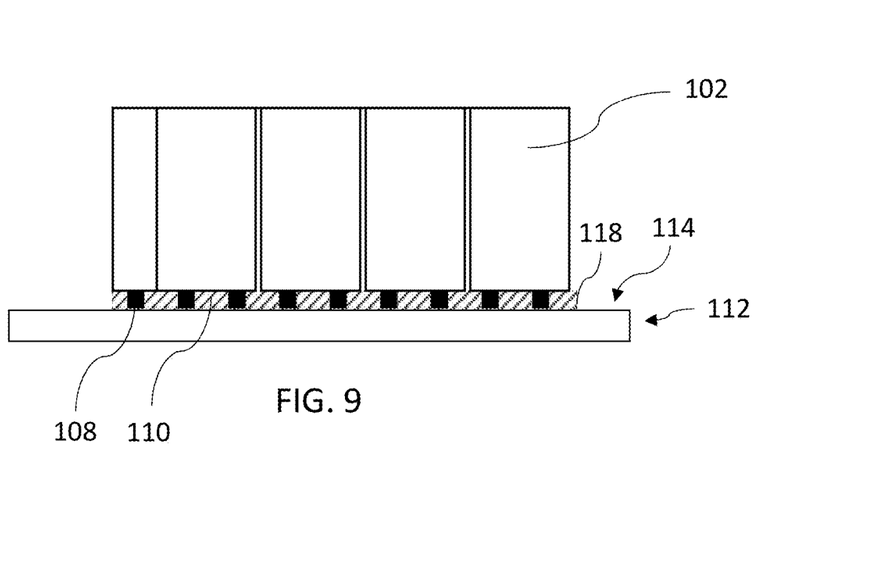
FIG. 9 shows a side view of the battery module assembly of FIG. 8, following providing a first plurality of battery cells on the adhesive, in accordance with some embodiments of the present disclosure.

FIG. 9 shows the battery module assembly of FIG. 8, following the disposing of the plurality of battery cells 102 on the securing adhesive 110, before the securing adhesive 110 is cured. As shown, the battery cells 102 are aligned with the adhesive standoff 108 and pressed down in the securing adhesive 110 towards the first cooling surface 114 until the first end 104 of the battery cells 102 are substantially supported by the adhesive standoff 108, as shown in greater detail in FIGS. 11 and 12. After the battery cells 102 are substantially supported by the adhesive standoff 108, the securing adhesive 110 is cured. That is, the adhesive standoff 108 maintains the first end 104 of each of the battery cells 102 at the distance D away from the first cooling surface 114 while the securing adhesive cures.

Figure 10:
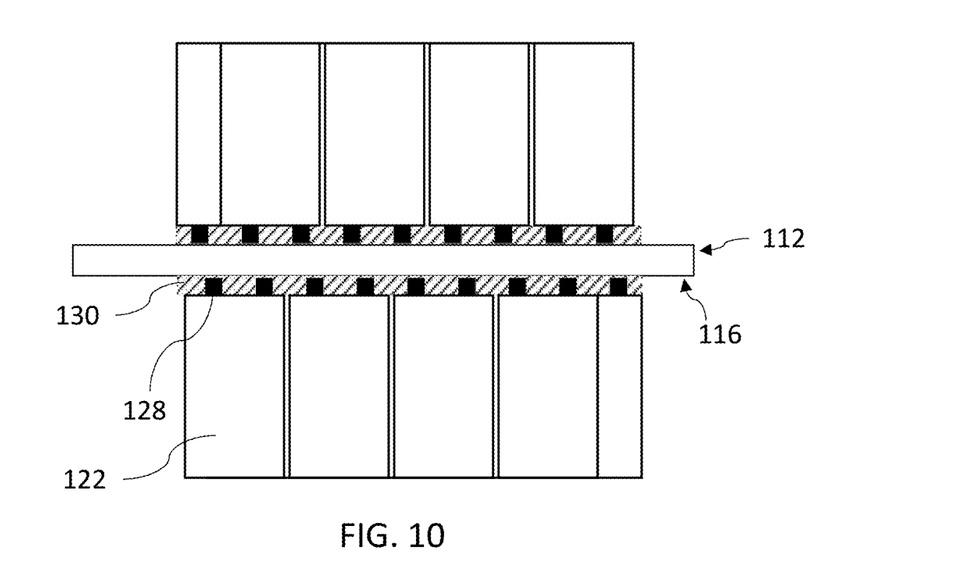
FIG. 10 shows a side view of the battery module assembly of FIG. 9, following providing a second plurality of battery cells on a second cooling surface of the cooling plate, in accordance with some embodiments of the present disclosure.

FIG. 10 shows the battery module assembly of FIG. 9, following the disposing of a second adhesive standoff 128, a second securing adhesive 130, and a second plurality of battery cells 122 on the second cooling surface 116, opposite the first cooling surface 114, of the cooling plate 112. The disposing of the second adhesive standoff 128, the second securing adhesive 130, and the second plurality of battery cells 122 may be substantially similar to the process described above in FIGS. 6-9, and is therefore not reproduced herein. It will be understood that cooling plate 112 may be turned over prior to applying the second adhesive standoff 128, the second securing adhesive 130, and the second plurality of battery cells 122.

Figure 11:
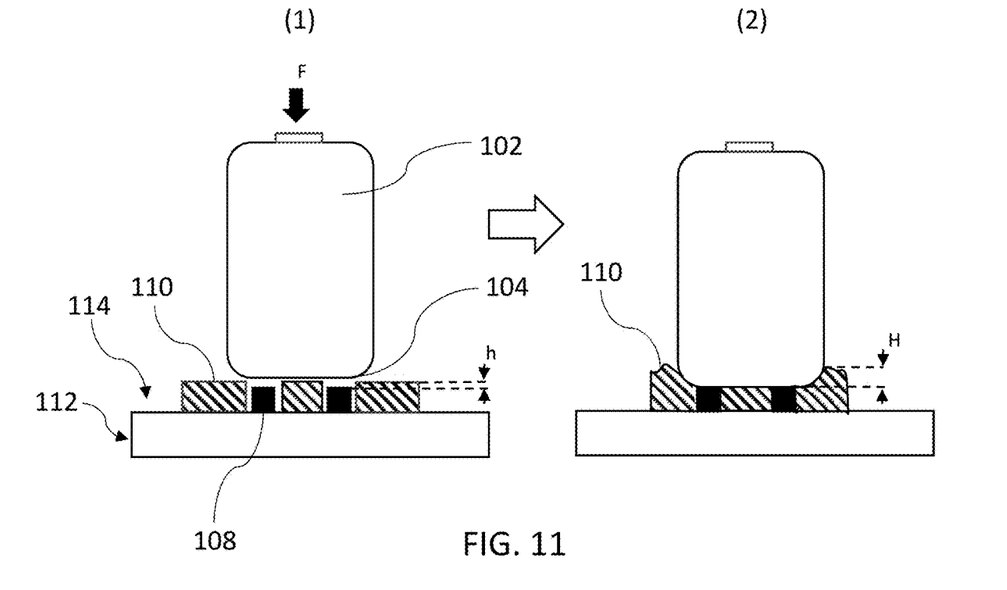
FIG. 11 shows a partial side view of the battery module assembly of FIGS. 8 and 9, in accordance with some embodiments of the present disclosure.

FIG. 11 shows a partial side view of the process described in FIGS. 8-9, in accordance with some embodiments of the present disclosure. As shown in (1) of FIG. 11, the securing adhesive 110 is disposed on either side of (e.g., between) each of the substantially cured strips of the adhesive standoff 108. In order to ensure that there are no gaps in the adhesive between the first end 104 of each of the battery cells 102 and the first cooling surface 114 of the cooling plate 112, the securing adhesive 110 may be disposed so as to have a greater height h than the substantially cured adhesive standoff 108. Thus, when the battery cells 102 are pushed towards the first cooling surface 114 by a force F, the battery cells 102 displace the securing adhesive 110 until the adhesive standoff 108 stops the movement of the battery cells 102 toward the first cooling surface 114 by acting as a standoff to maintain the battery cells 102 at the distance D from the first cooling surface 114.

As shown in (2) of FIG. 11, although a negligible amount of the securing adhesive 110 may remain between the top of the adhesive standoff 108 and the first end 104 of each of the battery cells 102 when the battery cells 102 are pushed by a force F, the majority of the extra adhesive of the securing adhesive 110 may be pushed up around the battery cells 102 so that the height of portions of the securing adhesive 110 may rise above the adhesive standoff by a distance H, and the thickness t of the adhesive standoff 108 may correspond to the distance D between the first end 104 of each of the battery cells 102 and the first cooling surface 114. The extra adhesive of the securing adhesive 110 may also be pushed out to the sides of the arrangement of the battery cells 102. In some embodiments, the securing adhesive 110 may also be applied to the first ends 104 of the battery cells 102 instead of (or in addition to) being applied to the first cooling surface 114. As shown, the ends of the battery cells 102 may be rounded.

Figure 12:
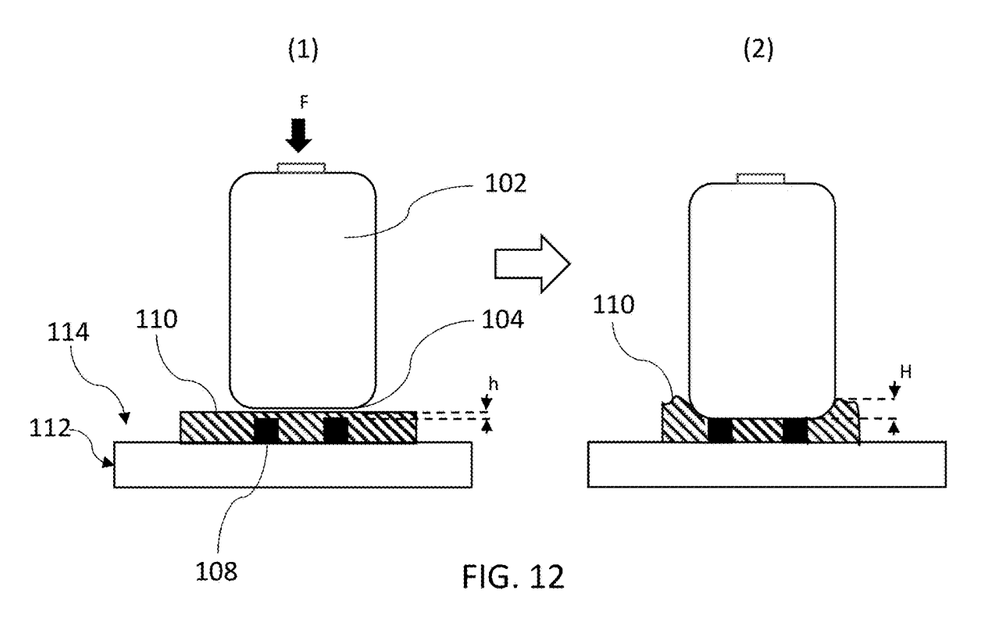
FIG. 12 shows a partial side view of the battery module assembly of FIGS. 8 and 9, in accordance with some embodiments of the present disclosure.

FIG. 12 shows a partial side view of the process described in FIGS. 8-9, in accordance with some embodiments of the present disclosure. The process in FIG. 12 is similar to the process in FIG. 11, except that instead of only disposing the securing adhesive 110 on either side of each of the substantially cured strips of the adhesive standoff 108 ((1) of FIG. 11), the securing adhesive 110 is also disposed on top of each of the substantially cured strips of the adhesive standoff 108 ((1) of FIG. 12). As shown, similar to FIG. 11, the securing adhesive 110 may be disposed so as to have a greater height h than the substantially cured adhesive standoff 108. As shown in (2) of FIG. 12, when the battery cells 102 are pushed toward the first cooling surface 114 of the cooling plate 112 by a force F, the battery cells 102 displace the extra adhesive of the securing adhesive 110 in a similar manner described with respect to FIG. 11.

Figure 13A:
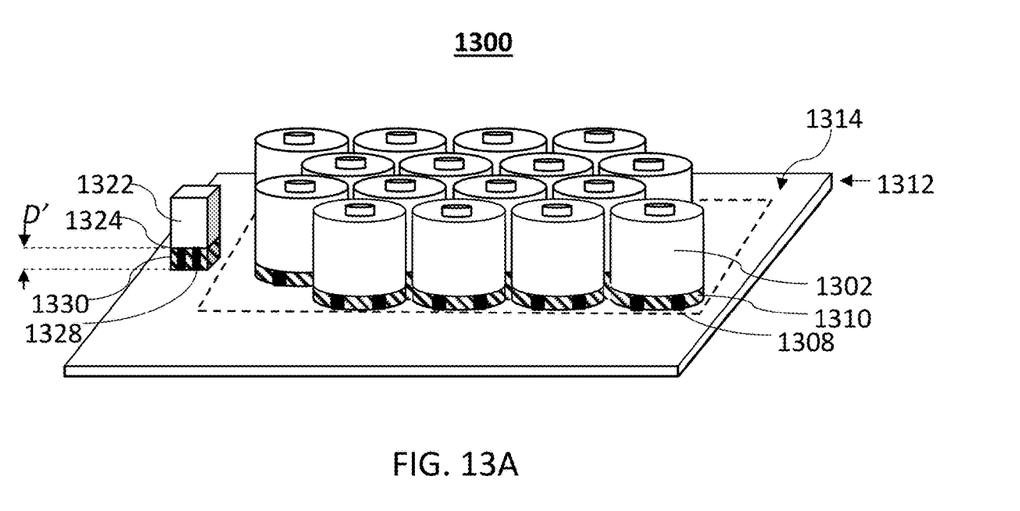
FIG. 13A shows a view of a battery module, in accordance with some embodiments of the present disclosure.

FIG. 13A shows a view of a battery module 1300, in accordance with some embodiments of the present disclosure. The battery module 1300 is similar to the battery module 100 in FIG. 1, except that the battery module 1300 also may additionally include a terminal 1322 secured to a first cooling surface 1314 of a cooling plate 1312. The terminal 1322 may be electrically connected to a plurality of battery cells 1302 through, e.g., busbars. Similar to the battery module 100 in FIG. 1, the battery cells 1302 may be spaced from the first cooling surface 1314 by a predetermined pattern of a first adhesive standoff 1308 having a first thickness, and secured to the first cooling surface 1314 by a first securing adhesive 1310.

The terminal 1322 may be spaced from the first cooling surface 1314 by a second adhesive standoff 1328 having a second thickness. As more clearly shown in FIG. 13B, the second adhesive standoff 1328 is arranged in a predetermined pattern that corresponds to the shape of a bottom surface 1324 of the terminal 1322. The terminal 1322 may then be secured to the first cooling surface 1314 by a second securing adhesive 1330. In order to maintain the terminal 1322 at a distance D' from the first cooling surface 1314, which corresponds to the second thickness of the second adhesive standoff 1328, the second adhesive standoff 1328 may be substantially cured (e.g., pre-cured) before either of the terminal 1322 or the second securing adhesive 1328 are added to the battery module 1300.

Figure 13B:
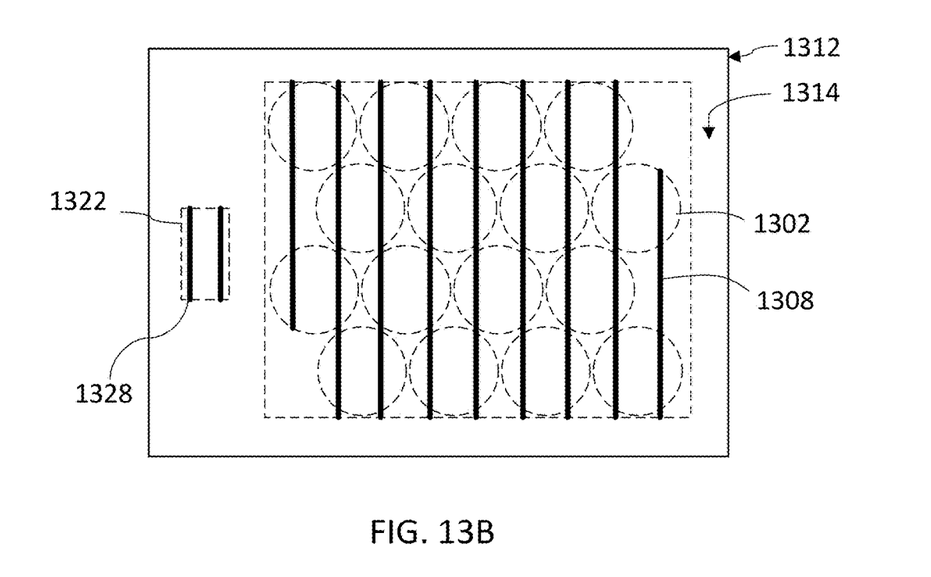
FIG. 13B shows a top view of an adhesive standoff disposed on a first cooling surface of a cooling plate, in accordance with some embodiments of the present disclosure.

FIG. 13B shows a top view of the first adhesive standoff 1308 disposed on a first portion of the first cooling surface 1314, and the second adhesive standoff 1328 disposed on a second portion of the first cooling surface 1314, in accordance with some embodiments of the present disclosure. As shown, the first adhesive standoff 1308 is arranged in a first predetermined pattern that corresponds to a predetermined arrangement (e.g., a hexagonal close-packed arrangement) of the battery cells 1302, and the second adhesive standoff 1328 is arranged in a second predetermined pattern that corresponds to the shape of the bottom surface 1324 of the terminal 1322. For example, the second adhesive standoff 1328 is arranged as two parallel strips of adhesive, so that the terminal 1322 is equally supported by the two parallel adhesive strips. However, this pattern is only one embodiment and the second adhesive standoff 1328 may be arranged in any pattern that sufficiently supports the terminal 1322.

The first adhesive standoff 1308 and the second adhesive standoff 1328 may have different thicknesses, which may correspond to the cooling requirements of the respective supported components. In some embodiments of the present disclosure, the second adhesive standoff 1328 and the second securing adhesive 1330 may be the same adhesive. The adhesive's electrical, thermal, and mechanical properties may correspond to the engineering and manufacturing requirements associated with the battery module 1300 and may be selected for reasons similar to those described with respect to FIG. 1. In some embodiments of the present disclosure, the first adhesive standoff 1308 and the second adhesive standoff 1328 may be cut from the same pre-cured adhesive sheet having the desired thicknesses for the respective supported components.

The foregoing is merely illustrative of the principles of this disclosure and various modifications may be made by those skilled in the art without departing from the scope of this disclosure. The above described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

What is claimed is:
1. A battery module comprising:
   a cooling plate having a cooling surface;
   an adhesive standoff disposed on the cooling surface;
   a securing adhesive disposed on the cooling surface, wherein the securing adhesive is disposed on the cooling surface after the adhesive standoff is substantially cured; and
   a plurality of battery cells, wherein a first end of each of the plurality of battery cells is secured to the cooling surface by the securing adhesive, and wherein the adhesive standoff maintains the first end of each of the plurality of battery cells a distance away from the cooling surface while the securing adhesive cures,
   wherein the adhesive standoff is arranged in a predetermined pattern that is different than the arrangement of the securing adhesive.

2. The battery module of claim 1, wherein the adhesive standoff and the securing adhesive have a same chemical formula.

3. The battery module of claim 1,
wherein respective portions of the predetermined pattern that maintain the first end of each of the plurality of battery cells the distance away from the cooling surface have a same arrangement of the adhesive standoff.

4. The battery module of claim 3, wherein the predetermined pattern is a plurality of parallel strips of the adhesive standoff, and
wherein the arrangement of the adhesive standoff of the respective portions of the predetermined pattern comprises exactly two of the plurality of parallel strips.

5. The battery module of claim 3, wherein the predetermined pattern is a plurality of clusters of at least three studs of the adhesive standoff, and
wherein the arrangement of the adhesive standoff of the respective portions of the predetermined pattern comprises exactly one cluster of the plurality of clusters.

6. The battery module of claim 3, wherein the predetermined pattern is a plurality of strips of the adhesive standoff arranged in a diagonal grid, and
wherein the first end of each of the plurality of battery cells is centered at an origin of a grid crossing of the diagonal grid.

7. The battery module of claim 3, wherein the adhesive standoff has a first thickness, and
wherein a width of a bottom surface of the predetermined pattern adjacent to the cooling surface is larger than a width of a top surface, opposite to the bottom surface, of the predetermined pattern.

8. The battery module of claim 1, wherein the plurality of battery cells is arranged in a hexagonal close-packed arrangement,
wherein each of the plurality of battery cells comprises an exposed region of electrically-active casing that covers the first end and a side of each of the plurality of battery cells, and
wherein a dielectric coating on a first side of the cooling plate forms the cooling surface.

9. The battery module of claim 1, wherein the adhesive standoff is a first adhesive standoff,
wherein the securing adhesive is a first securing adhesive, and
wherein the battery module further comprises:
a second adhesive standoff disposed on the cooling surface;
a second securing adhesive disposed on the cooling surface, wherein the second securing adhesive is disposed on the cooling surface after the second adhesive standoff is substantially cured; and
a terminal, wherein a bottom surface of the terminal is secured to the cooling surface by the second securing adhesive, and wherein the second adhesive standoff maintains the bottom surface of the terminal a distance away from the cooling surface while the second securing adhesive cures.

10. The battery module of claim 1, wherein the cooling surface is a first cooling surface,
wherein the adhesive standoff is a first adhesive standoff,
wherein the securing adhesive is a first securing adhesive,
wherein the plurality of battery cells is a first plurality of battery cells,
wherein the cooling plate further comprises a second cooling surface, opposite to the first cooling surface, and
wherein the battery module further comprises:
a second adhesive standoff disposed on the second cooling surface;
a second securing adhesive disposed on the second cooling surface, wherein the second securing adhesive is disposed on the second cooling surface after the second adhesive standoff is substantially cured; and
a second plurality of battery cells, wherein a first end of each of the second plurality of battery cells is secured to the second cooling surface by the second securing adhesive, and wherein the second adhesive standoff maintains the first end of each of the second plurality of battery cells a distance away from the second cooling surface while the second securing adhesive cures.

11. A method of assembling a battery module, the method comprising:
providing an adhesive standoff on a cooling surface;
providing, after the adhesive standoff is substantially cured, a securing adhesive on of the cooling surface;
pressing, before the securing adhesive is cured, a first end of each of a plurality of battery cells into the securing adhesive, wherein the adhesive standoff maintains the first end of each of the plurality of battery cells at a distance away from the cooling surface while the securing adhesive cures; and
curing the securing adhesive to secure the plurality of battery cells to the cooling surface,
wherein the providing the adhesive standoff on the cooling surface comprises arranging the adhesive standoff in a predetermined pattern that is different than the arrangement of the securing adhesive.

12. The method of claim 11, wherein the adhesive standoff and the securing adhesive have a same chemical formula.

13. The method of claim 11,
wherein respective portions of the predetermined pattern that maintain the first end of each of the plurality of battery cells the distance away from the cooling surface have a same arrangement of the adhesive standoff.

14. The method of claim 13, wherein the predetermined pattern is a plurality of parallel strips of the adhesive standoff, and
wherein the arrangement of the adhesive standoff of the respective portions of the predetermined pattern comprises exactly two of the plurality of parallel strips.

15. The method of claim 13, wherein the predetermined pattern is a plurality of clusters of at least three studs of the adhesive standoff, and
wherein the arrangement of the adhesive standoff of the respective portions of the predetermined pattern comprises exactly one cluster of the plurality of clusters.

16. The method of claim 13, wherein the predetermined pattern is a plurality of strips of the adhesive standoff arranged in a diagonal grid, and
wherein the method further comprises centering the first end of each of the plurality of battery cells at an origin of a grid crossing of the diagonal grid.

17. The method of claim 13, wherein the adhesive standoff has a first thickness, and
wherein a width of a bottom surface of the predetermined pattern adjacent to the cooling surface is larger than a width of a top surface, opposite to the bottom surface, of the predetermined pattern.

18. The method of claim 11, further comprising:
arranging the plurality of battery cells in a hexagonal close-packed arrangement; and disposing a dielectric coating on a first side of a cooling plate to form the cooling surface,
wherein each of the plurality of battery cells comprises an exposed region of electrically-active casing that covers the first end and a side of each of the plurality of battery cells.

19. The method of claim 11, wherein the adhesive standoff is a first adhesive standoff,
wherein the securing adhesive is a first securing adhesive, and
wherein the method further comprises:
provding a second adhesive standoff on the cooling surface;
providing, after the second adhesive standoff is substantially cured, a second securing adhesive on the cooling surface;
providing a terminal;
pressing, before the second securing adhesive is cured, a bottom surface of the terminal into the second securing adhesive, wherein the second adhesive standoff maintains the bottom surface of the terminal at a distance away from the cooling surface while the second securing adhesive cures; and
curing the second securing adhesive to secure the terminal to the cooling surface.

20. The method of claim 11, wherein the cooling surface is a first cooling surface of a cooling plate,
wherein the adhesive standoff is a first adhesive standoff,
wherein the securing adhesive is a first securing adhesive,
wherein the plurality of battery cells is a first plurality of battery cells, wherein the cooling plate further comprises a second cooling surface, opposite the first cooling surface, and
wherein the method further comprises:
providing a second adhesive standoff on the second cooling surface;
providing, after the second adhesive standoff is substantially cured, a second securing adhesive on the second cooling surface;
providing a second plurality of battery cells;
pressing, before the second securing adhesive is cured, a first end of each of the second plurality of battery cells into the second securing adhesive, wherein the second adhesive standoff maintains the first end of each of the second plurality of battery cells a distance away from the second cooling surface while the second securing adhesive cures; and
curing the second securing adhesive to secure the second plurality of battery cells to the second cooling surface.

* * * * *

UNITED STATES PATENT AND TRADEMARK OFFICE
CERTIFICATE OF CORRECTION

PATENT NO. : 11,837,706 B2
APPLICATION NO. : 16/824375
DATED : December 5, 2023
INVENTOR(S) : Cournoyer It is certified that error appears in the above-identified patent and that said Letters Patent is hereby corrected as shown below:

In the Claims

In Claim 11, at Column 12, Line 20, please delete "of" after "adhesive on".

Signed and Sealed this
Twenty-seventh Day of February, 2024

Katherine Kelly Vidal
*Director of the United States Patent and Trademark Office*